April 26, 1932.  H. B. NIELSEN  1,855,585
DAMPING DEVICE
Filed Aug. 26, 1930
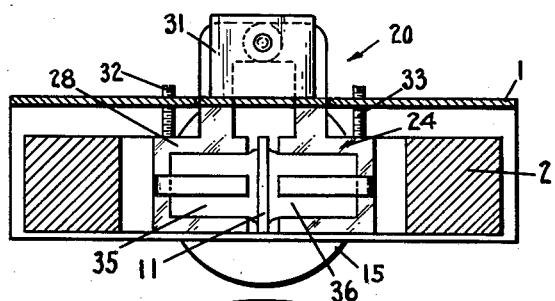
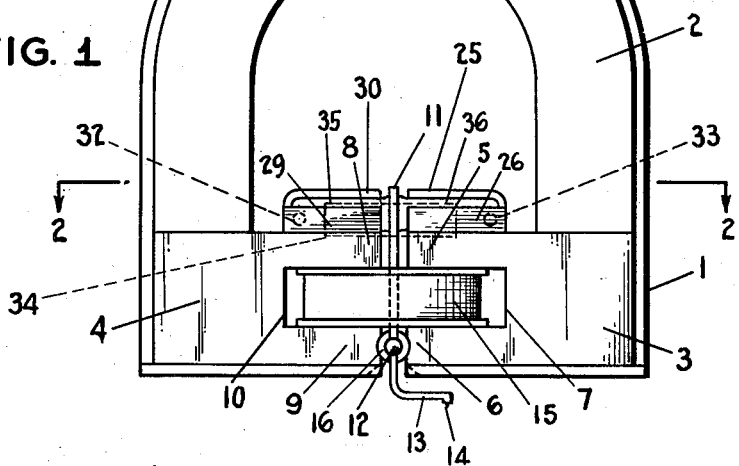
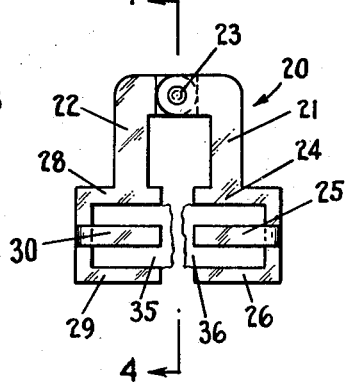
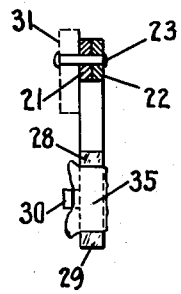
INVENTOR
HANS B NIELSEN
BY
Henry Lanahan
ATTORNEY Patented Apr. 26, 1932

1,855,585

UNITED STATES PATENT OFFICE

HANS B. NIELSEN, OF WEST ORANGE, NEW JERSEY, ASSIGNOR TO THOMAS A. EDISON, INCORPORATED, OF WEST ORANGE, NEW JERSEY, A CORPORATION OF NEW JERSEY

DAMPING DEVICE

Application filed August 26, 1930. Serial No. 477,808.

This invention relates to apparatus for controlling the damping of a vibratile element in an electro-magnetic system, for example the armature of an electric phonograph pickup, and while the apparatus is particularly adapted for use with a pickup, it will be understood that its use is not limited thereto, but that the apparatus may be incorporated in electrical recorders, telephones, loud speakers, and the like, in which it is desired to introduce controllable damping of the vibratile member.

It is an object of this invention to provide apparatus which shall be simple, effective and positive for controlling and adjusting the neutral position and the amount of damping of a vibratile armature in a system of the class described.

It is a further object of this invention to provide apparatus of the class described in which the armature is confined between a pair of damping members on opposite sides thereof, and in which the position of either damping member and the pressure exerted by either damping member on the armature may be easily and quickly adjusted.

It is a further object of this invention to provide apparatus of the class described in which the damping members are controlled by screws which perform the double function of adjusting the position of the damping members and of holding the damping members in adjusted position.

Still other objects and advantages of my invention will be apparent from the specification.

The features of novelty which I believe to be characteristic of my invention are set forth with particularity in the appended claims. My invention itself, however, both as to its fundamental principles and as to its particular embodiments will best be understood by reference to the specification and drawings, in which Fig. 1 is a side elevation of a pickup in accordance with my invention;

Fig. 2 is a section on lines 2—2 of Fig. 1;

Fig. 3 is a plan view of the damping brackets, and

Fig. 4 is a section on lines 4—4 of Fig. 3 showing more particularly the method of attaching the damping brackets to the support.

Referring now more particularly to Fig. 1, 1 designates the main frame or support for the pickup, 2 a suitable magnet secured thereto and 3 and 4 the pole pieces. Pole piece 3 is provided with pole faces 5 and 6 and an intermediate cut-away portion 7, and similarly pole piece 4 is provided with pole faces 8 and 9 and an intermediate cut-away portion 10.

A vibratile armature 11 is pivotally mounted on an axis 12 and provided with an offset stylus holding arm 13 to which is secured a suitable stylus 14. A coil 15 is positioned within the cutouts 7 and 10 in pole pieces 3 and 4 and surrounds the armature 11. Suitable damping material 16, such as rubber, may be clamped between the pivot 12 of the armature and the supporting pole faces. The construction thus far described is a suitable form of pickup mechanism known in the art, but it will be understood that other forms may be utilized.

The position of the armature and the amount of damping thereof may be controlled by means of the damping brackets generically indicated as 20 and comprising a pair of substantially L-shaped members 21 and 22 pivoted at the free ends of the base of the L as at 23 and provided at the free end of the long arm of the L with claws for holding damping material. The claws may consist of spaced arms 24 and 26 on the member 21 and spaced arms 28 and 29 on the member 22, and an intermediate offset arm 25 on member 21 and an intermediate offset arm 30 on member 22.

The brackets preferably are formed each from a single stamping and are cut away at the point of hinging to provide a joint no thicker than the thickness of the individual bracket. The bracket assembly is pivoted upon a shelf or projection 31 secured to the casing 1, and the casing is cut away or slotted as at 34 to permit the brackets to pass therethrough.

Set screws 32 and 33 are provided in the casing 1, the set screw 32 bearing against the rear face of arm 28 and the set screw 33 bearing against the rear face of arm 24. The casing 1 is tapped for the screws 32 and 33 which are free to rotate on the faces of arms 24 and 28. Preferably screws 32 and 33 are not attached to arms 24 and 28 but merely bear against the faces of the said arms. Pieces of damping material 35 and 36 are inserted within the claws. The damping material may be rubber, felt or the like.

In operation the screws 32 and 33 may first be left loose. Thereafter they may be rotated to be brought into contact with the faces of arms 24 and 28, and continued rotation to move the screws inward will cause the brackets to rotate toward each other about the pivot 23 thereby causing the damping material in each bracket to be pressed against the armature. It will be understood that by the proper individual adjustment of the screws 32 and 33 the armature may be centered between the pole pieces and the degree of damping adjusted to the desired value.

It will also be understood that the adjustment is, so to speak, self-locking and requires no locking nuts, locking screws or the like. In case it is desired to decrease the degree of damping it is only necessary to reverse the direction of rotation of the screws, whereupon the resilience of the damping material will cause the brackets to rotate away from each other to maintain the faces of arms 24 and 28 against screws 32 and 33, respectively.

While I have shown and described certain preferred embodiments of my invention, it will be understood that modifications and changes may be made without departing from the spirit and scope thereof as will be understood by those skilled in the art.

What I claim is:

1. Electromagnetic apparatus comprising, in combination, a support, pole pieces arranged in spaced relation on said support, an armature mounted for vibration between said pole pieces, brackets pivotally mounted on said support on opposite sides of said armature, damping material carried by each of said brackets for swinging movement about the pivotal axis of the latter, and means for controlling the pivotal position of said brackets.

2. Electromagnetic apparatus comprising, in combination, a support, pole pieces arranged in spaced relation on said support, an armature mounted for vibration between said pole pieces, brackets pivotally mounted on said support on opposite sides of said armature, damping material carried by said brackets, and means extending through said support for adjusting the position of said brackets.

3. Electromagnetic apparatus comprising, in combination, a support, pole pieces arranged in spaced relation on said support, an armature mounted for vibration between said pole pieces, brackets pivotally mounted on said support on opposite sides of said armature, damping material carried by said brackets, and set screws mounted in said support for rotating said brackets.

4. Damping control apparatus for pickups and the like, comprising, in combination, a pair of substantially L shaped members each having a claw at the free end of the long arm of the L for holding damping material, said members being pivotally secured to each other at the free end of the base of the L.

5. Damping control apparatus for pickups and the like, comprising, in combination, a pair of substantially L shaped members, each having a claw at the free end of the long arm of the L for holding damping material, each claw comprising a pair of spaced fingers and an intermediate finger offset from the plane of said spaced fingers, said members being pivotally secured to each other at the free end of the base of the L.

This specification signed this 21st day of August, 1930.

HANS B. NIELSEN.